United States Patent [19]

Suzuki et al.

[11] 4,138,732
[45] Feb. 6, 1979

[54] DATA TRANSFER CONTROL SYSTEM

[75] Inventors: Seigo Suzuki; Keiji Uemori, both of Yokohama, Japan

[73] Assignee: Tokyo Shibaura Electric Co., Ltd., Kawasaki, Japan

[21] Appl. No.: 735,961

[22] Filed: Oct. 27, 1976

[30] Foreign Application Priority Data

Oct. 31, 1975 [JP] Japan .................. 50-131174

[51] Int. Cl.$^2$ .................. G06F 13/00; G11C 19/00
[52] U.S. Cl. .................. 364/900
[58] Field of Search ... 364/200 MS File, 900 MS File; 365/80, 81

[56] References Cited

U.S. PATENT DOCUMENTS 3,516,069  6/1970  Bray et al. .................. 364/200

OTHER PUBLICATIONS

Skov et al., *Buffer System*, IBM Tech. Disc. Bulletin, vol. 2, No. 5, Feb. 1960, pp. 86–89.

Primary Examiner—Gareth D. Shaw
Assistant Examiner—Thomas M. Heckler
Attorney, Agent, or Firm—Finnegan, Henderson, Farabow and Garrett

[57] ABSTRACT

A data transfer control system for controlling data transfer between a processor and an input/output device comprises a multi-layer stack for temporarily storing transfer data, such as a first-in first-out stack or a last-in first-out stack; first and second up/down counters having a preset function and permitting any designated address at the stack to be varied; and first and second pointer registers for storing any initially designated address data which is stored in the counter. The first counter permits a direction of a count operation to be determined by the processor and the first point register has an initially designated address data stored therein by the processor. The second counter permits a direction of a count operation to be determined by the input/output device and the second point register has an initially designated address data stored therein by the input/output device. The direction of a data flow at the stack is varied dependent upon the direction in which the first and second counters effect count operations.

4 Claims, 8 Drawing Figures

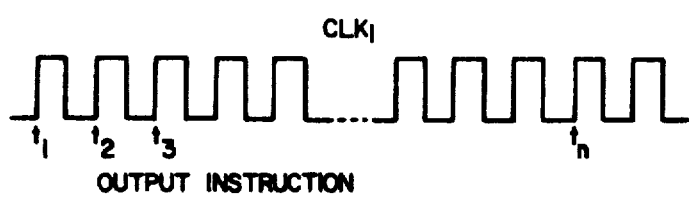
FIG. 5A
FIG. 5B
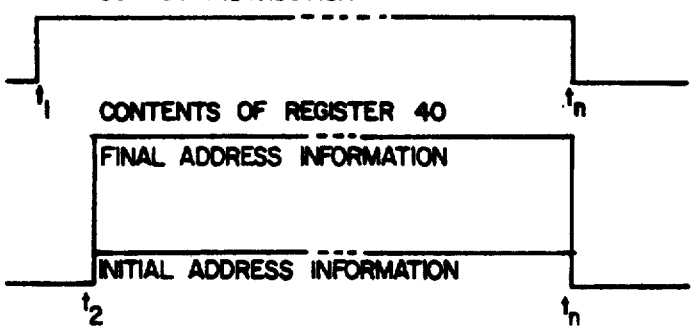
FIG. 5C
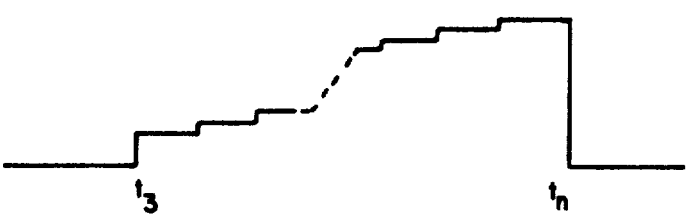
FIG. 5D

DATA TRANSFER CONTROL SYSTEM

BACKGROUND OF THE INVENTION

This invention relates to a data transfer control system and, in particular, a system for controlling a data transfer using a first-in/first-out stack. The invention is also applicable to data transfer control systems utilizing other than first-in first-out stacks, for example, a last-in first-out stack (hereinafter referred to as LIFO stack).

Generally, in a data processing system such as a minicomputer, microcomputer, etc., a first-in/first-out stack, for example, (hereinafter referred to as a FIFO stack) having a data buffer function is used as an interface for data transfer.

FIG. 1 shows a conventional data transfer control system using, for example, a FIFO type stack. Reference numeral 11 is a processor and reference numeral 12 is an input/output device. Between the processor 11 and the input/output device 12 first and second FIFO stacks 13 and 14 are provided through buses. The first FIFO stack 13 is adapted to transfer data from the processor 11 to the input/output device 12 and the second FIFO stack 14 is adapted to transfer data from the input/output device to the processor 11. Usually, data are bidirectionally transferred between the processor 11 and the input/output device 12. Since, however, the conventional FIFO stack permits only a unidirectional data flow, it is necessary to provide two stacks different in direction from each other. Furthermore, data once stored in the stacks 13 and 14 can not be loaded into the processor by any access from the outside of the stack.

SUMMARY OF THE INVENTION

It is accordingly the object of this invention to provide a data transfer control system capable of bidirectionally transferring data using a single stack such as FIFO or LIFO stack and capable of loading a data in the stack into a processor by any access from the outside of the stack.

According to this invention there is provided a data transfer control system for controlling a data transfer between a processor and an input/output device, comprising a multi-layer FIFO stack such as a multi-layer FIFO or LIFO stack adapted to temporarily store data; a first up/down counter having a preset function and permitting any designated address to be varied by the processor; a second up/down counter having a preset function and permitting any designated address at the stack to be varied; a first point register for storing an initially designated address data which is sent from the processor so as to cause the first up/down counter to be present; and a second point register for storing any initially designated address data which is sent from the input/output device so as to cause the second up/down counter to be present.

According to this invention a bidirectional data transfer to which one object of this invention is directed can be effected and therefore the first and second up/down counters permit the direction of the counter operation to be determined by the processor and input/output device, making it possible to effect a bidirectional data flow at the single stack.

Furthermore, since data in the stack can be loaded by any access into the processor, the first and second pointer registers permit any initially designated address data to be set by the processor and input/output device, respectively, and any addresses at the stack can be designated by presetting the set address data to the first and second counters.

BRIEF DESCRIPTION OF THE DRAWING

This invention will be further described by way of example by referring to the accompanying drawings in which:

FIGS. 5A to 5D are timing charts illustrating the timing relationships of the control and data signals of the FIG. 2 embodiment.

DETAILED DESCRIPTION OF THE PREFERRED EMBODIMENTS

Figure 1:
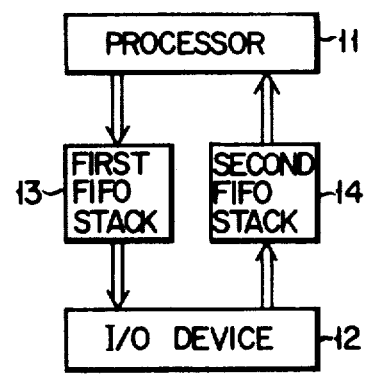
FIG. 1 is a block diagram showing a conventional data transfer control system.
Figure 2:
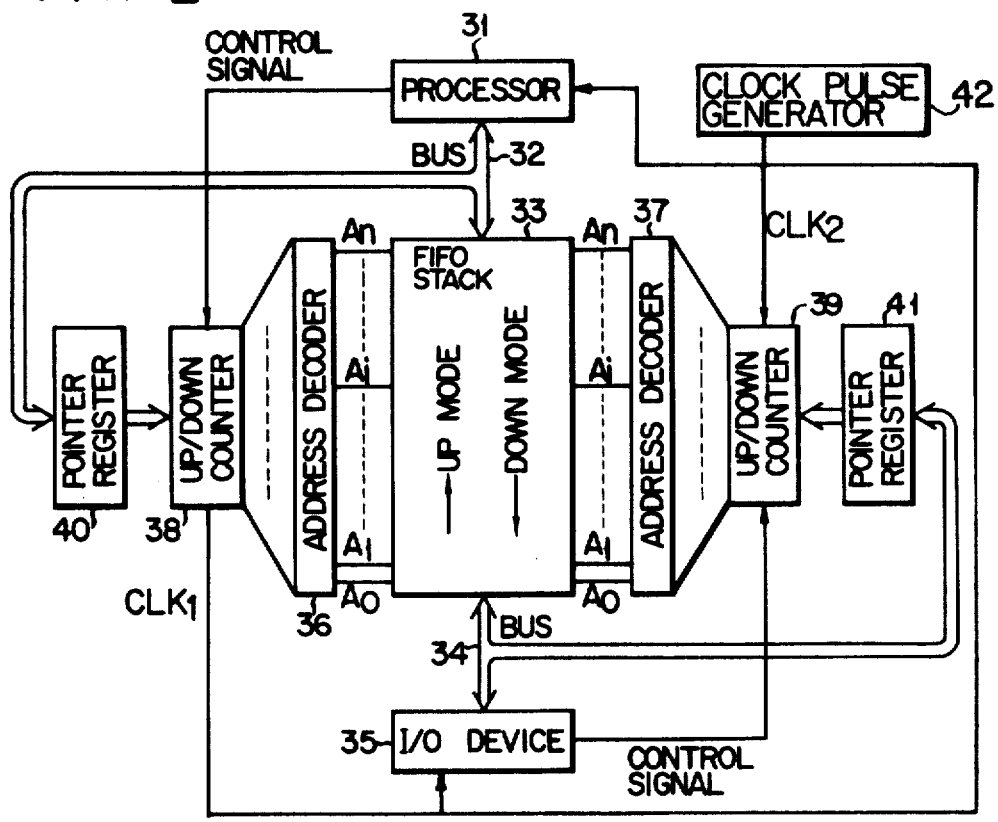
FIG. 2 is a block diagram showing a data transfer control system.

In FIG. 2 a processor 31 is a central processing unit (CPU) of, for example, a minicomputer and microcomputer. The processor 31 is connected through a data bus 32 to a first-in/first-out or last-in first-out stack (FIFO or LIFO stack, respectively) 33. The stack 33 is of a data transfer type in which a group of shift registers are arranged in a multi-layer fashion. The stack 33 has a data buffer function and it is connected through a bus 34 to an input/output device (I/O device) such as a disk control interface, line printer interface and communication peripheral device. The stack 33 is connected through address lines $A_0, A_1 \ldots A_n$ to a pair of address decoders 36, 37. The address decoders 36 and 37 are connected to corresponding up-down counters 38, 39, respectively. The up-down counters 38 and 39 are each of a type having a preset function. Pointer registers 40 and 41 for storing a count initial address (an initial setting value) are connected to the preset terminals of the counters 38 and 39. The address decoders 36 and 37 and up-down counters 38 and 39 can easily be constructed by techniques commonly used in a computer field. The point register 40 is connected to the bus 32 at the processor 31 side and conversely the point register 41 is connected to the bus 34 at the I/O device 35 side. The up-down counter 38 is so controlled as to execute an up count or a down count by a control signal from the processor 31. Likewise, the up-down counter 39 is so controlled as to execute an up count or down count by a control signal from the I/O device 35. That is, the count switches of the counters 38 and 39 are effected by the control signal. The counters 38 and 39 are sequentially counted up or down in time with clock signals CLK1 and CLK2, which are continuously generated by clock pulse generator 42.

It is to be noted that the same reference symbols are employed for convenience sake to designate the address lines of the stack and the addresses used in the stack, register and up/down counter.

The transfer control of this system will now be explained below through a series of exemplary data transfers.

Figure 3:
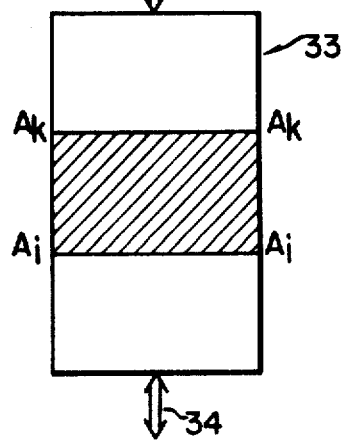
FIGS. 3 and 4, each, shows the data storage state of a FIFO stack for explaining the action of the system in FIG. 2.

(a) A data transfer to the processor 31 will be explained by referring to FIG. 3, stack 33 in this example comprising a last-in first-out stack.

Whether an instruction to be executed is an input instruction or an output instruction is programmed in the processor 31. When the output instruction is involved, the data is transferred from the processor 31 through the bus 32 to the LIFO stack 33. By the output instruction an input/output buffer (not shown) at the processor side is rendered in an operative state and the initial address of the LIFO stack 33 for initiating a data transfer is fed from the processor 31 through the bus 32 to the pointer register 40. With the initial address represented, for example, by an $A_i$ address as shown in FIG. 3 an address value $A_i$ is stored in the register 40, and the so stored address $A_i$ is preset to the up-down counter 38 with a predetermined timing. An up count control signal is applied to the counter 38 from the processor 31 by the output instruction of the program to cause the direction of data flow at the LIFO stack 33 to be switched to an up mode. The initial value $A_i$ stored in the counter 38 designates the address line $A_i$ at the LIFO stack through the address decoder 36. In consequence the processor 31 permits a data to be stored in the address $A_i$ at the stack designated by the decoder 36, that is, to be stored in the transfer data storage initiate address $A_i$. The counter 38 permits the address to be stepped each time the counter 38 has the content counted up by a sequentially generated clock signal CLK1 from clock pulse generator 42. The data fed through the bus 32 from the processor 31 is sequentially stored in the address at the stack designated. When the count value of the counter 38 reaches an address value $A_k$ designated by the program, no count clock signal CLK1 is generated and the output instruction of the program disappears. Consequently, the counter 38 is stopped at the count value $A_k$. That is, the data fed from the processor 31 is stored into the address $A_i$ to address $A_k$ at the LIFO stack 38.

Now suppose the count value $A_k$ of the counter 38 to be a top address when viewed from the processor 31.

(b) Where it is desired that after the completion of a data transfer as explained at section (a) those data (see FIG. 3) stored at the address $A_i$ to $A_k$ are again loaded into the processor 31, it is only necessary that an input instruction (a read instruction of the program) be executed to the processor 31. That is, when a down count control signal is applied from the processor 31 to the counter 38 the direction of data flow at the stack 33 is switched to the down mode. Since in this case the counter 38 has the content $A_k$, the counter 38 effects sequential down count from the top address $A_k$ upon receipt of the clock signal (CLK1). Since a variation in the count value of the counter 38 causes a designated address to be stepped, a data stored in the stack 33 is sequentially loaded through the bus 32 into the processor 31 according to the designated data.

Figure 4:
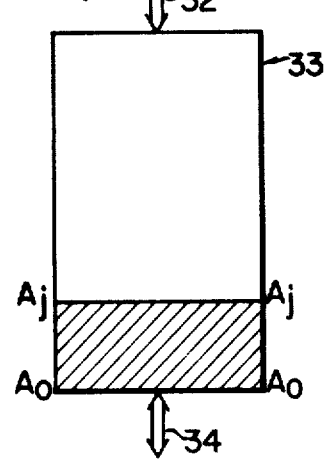

(c) A data transfer from the I/O device to the FIFO stack 33 will be explained by referring to FIG. 4 stack 33 in this example comprising a first-in first-out stack.

Since in this case the pointer register 41 is usually cleared, the content of the register 41 is zero. When a data transfer instruction is fed from the I/O device 35 to this system, an input/output buffer circuit (not shown) at the I/O device side is rendered in the operative state and an up count control signal is applied to the counter 39 to cause the direction of a data flow at the stack to be switched to an up mode. The content (zero) of the register 41 is preset to the counter 39. An address $A_O$ at the stack 33 is designated through the address decoder by an initial value output signal from the counter 39. In consequence, a data fed from the I/O device is stored into the address $A_O$ at the stack 33 through the bus 34. The counter 39 effects an up count in increments of one unit by a sequentially generated clock signal CLK2 from clock pulse generator 42. Since a variation in the count value of the counter 39 causes a designated address to be stepped, data fed from the I/O device 35 is sequentially stored in the address following the address $A_O$.

When, for example, block data up to $j + 1$ are transferred from I/O device 35 the data are stored in the addresses $A_O$ to $A_j$ at the stack. When a predetermined length of data ($j + 1$ number of data block) is transferred, a data transfer is stopped. When a stop code is read out from the I/O device 35, the data transfer instruction is cancelled, thereby causing such data transfer to be stopped. After transfer of a predetermined data length the counter 39 has a count value $j$ and the pointer register 41 has a content "zero". The top address of the stack 33 is an $A_j$ address when viewed from the I/O device 35. The top address is an $A_j$ address when viewed from the stack 33.

(d) A transfer to the I/O device 35 of data (FIG. 3) stored in addresses $A_j$ to $A_k$ at the stack 33 after a data transfer control is effected will be explained below, stack 33 in this example comprising a last-in first-out stack.

In this case, the pointer register 40 has an initial value address data $A_i$ stored therein and the counter 38 has a count value $A_k$. Consequently, a data transfer instruction is given to the processor to cause the input-output buffer register (not shown) at the I/O device 35 side to be rendered in an operative state. A down count control signal generated by the program is applied from the processor 31 to the counter 38 to cause the direction of data flow at the stack 33 to be switched to the down mode. Each time one address block data is transferred from the address $A_k$ at the LIFO stack 33 through the bus 34 to the I/O device 35, the content of the counter 38 is sequentially subtracted in increments of one unit from the initial value $A_k$. If a data transfer is programmed to be stopped when the content of the counter 38 becomes the value $A_i$, all the data in the address $A_k$ is transferred from the address $A_i$ in the stack 33 to the I/O device 35 through the bus 34.

(e) A transfer of data (FIG. 4) stored in addresses $A_O$ to $A_j$ at the stack 33 to the processor 31 will be explained below, stack 33 in this example comprising a first-in first-out stack.

In this case, the pointer register 41 has the initial value address data $A_O$ stored therein and the counter 39 has an address value $A_j$. A data transfer instruction is given from the I/O device 35 to this system to cause the input/output buffer circuit (not shown) at the processor 31 side to be rendered in the operative state, and a down count control signal is applied from the I/O device 35 to the counter 39 to cause the direction of a data flow at the stack 33 to be switched to the down mode. Each time one address data block is transferred from the top address $A_j$ at the stack 33 to the processor 31 through the bus 32 the content of the counter 39 is subtracted in increments of one unit from the initial value $A_j$. If a data transfer is programmed to be stopped when the content of the counter 39 becomes the value $A_j$, all the data stored in the addresses $A_j$ to $A_O$ at the stack 33 are transferred to the processor 31 through the bus 32.

As mentioned above, the data transfer control system can bidirectionally perform a data transfer using a single stack, and the stack can be operated either in the up mode or in the down mode, thus showing a high stack utilization efficiency.

The timing relationships between the various data and control signals of the system will now be described with reference to FIGS. 5A-5D.

In the data transfer control system of this invention, a clock pulse train $CLK_1$ (FIG. 5A) is continuously supplied to the processor 31. Now suppose that an output instruction (FIG. 5B) is generated from the processor 31 at time $t_1$, namely, in synchronism with a first clock pulse of the train $CLK_1$. Initial and final address information are transferred from the processor to the pointer register 40 (FIG. 5C) through the bus 32 at time $t_2$, namely, in synchronism with a second clock pulse of the train $CLK_1$.

The initial address information is then loaded in the U/D counter 38 (FIG. 5D) at time $t_3$, namely, in synchronism with a third clock pulse of the train $CLK_1$. The loaded initial address information is decoded by the decoder 36. The decoder 36 thus designates the initial address at the stack 33 corresponding to the information. Then, a first data is transferred into the initial address of the stack 33 from the processor 31.

The counter 38 is sequentially supplied with clock pulses of the train $CLK_1$. The counter 38 has the contents counted up by a logical "1" (FIG. 5D) and decoded by the decoder 36 each time it receives a clock pulse of the train $CLK_1$. Every content of the counter 38 is decoded by the decoder 36. An address of the stack 33 designated by the decoder 36 is sequentially changed. Then, data from the processor 31 is sequentially stored in the address of the stack designated. When the count value of the counter 38 reaches the final address information at time $t_n$, the output instruction is terminated (FIG. 5B). Consequently, clock pulse signal $CLK_1$ is no longer counted and the operation of the counter 38 is stopped.

It will be observed that communication between the processor 31 and the I/O device 35 is not required in the data transfer control system of this invention. Initial and final address information are entered into pointer register 40 by means of the processor 31. In contrast, initial and final address information are entered by the I/O device 35 into the pointer register 41. Namely, data transfer between the processor 31 and the stack 33 can be achieved by an instruction from the processor 31 without the necessity of communication between the processor 31 and the I/O device 35. Similarly, a data transfer between the I/O device 35 and the stack 33 can be achieved by an instruction from the I/O device 35 without any necessity of communication between the processor 31 and the I/O device 35.

Accordingly, it will be seen that data is independently transferred between the processor 31 and the stack 33 and between the I/O device 35 and the stack 33. With this transfer system, therefore, bidirectional transfer of information can be achieved simultaneously. Namely, data can be transferred from the processor 31 and the I/O device 35 to the stack 33 simultaneously in both directions.

Now let it be assumed that output instructions are read out from both the processor 31 and the I/O device 35 and an address $A_o$ is designated as the initial address to be stored with data from the I/O device 35 and an address Ak is designated as the initial address to be stored with data from the processor 31. In this case, the U/D counter 39 has the contents counted up each time it receives a clock pulse of the clock pulse train $CLK_2$. The address decoder 37 decodes the contents of the counter 39. Thus, an address designated by the decoder 37 is changed sequentially from the initial address $A_o$ towards an address, e.g., An. Data from the I/O device 35 are stored sequentially into the designated addresses.

The same is true for the data transfer between the processor 31 and the stack 33. Namely, the U/D counter 38 has the contents counted up each time it receives a clock pulse of the train $CLK_1$. Then, an address of the stack 33 designated by the decoder 36 is sequentially changed from the initial address Ak towards an address, e.g., Al. As a result, data from the processor 31 are sequentially stored from the initial address Ak towards an address Al.

In order to generally determine the direction of a data transfer between the processor and the I/O device it is necessary to firstly determine the direction of a data transfer to and from the processor 31, then to determine the operative direction of the stack and finally determine the direction of a data supply to and from the I/O device all using a program. The processor and I/O device require a certain time lag to determine the input and output directions. The data transfer control system according to this invention can readily determine the operative direction of the stack by a control signal during the time period in which the direction of a data transfer to and from the processor and I/O device is determined. In this case, the pointer register 41 and up/down counter are controlled at the I/O device side (in the above-mentioned embodiment), but they can be controlled either directly at the processor side or from the processor through the I/O device. Further, in this system another processor can be used in place of said I/O device 35. Namely, the system construction having a stack 33 provided between one processor and another processor also makes possible the same control as mentioned above. Since in this system any address can be set to the point register, data can be stored in any address at the stack and data can also be loaded into the processor from any address in the stack. Therefore, this system is simple in structure and has a general-purpose data transfer control function.

What we claim is:

1. In combination with a data transfer control system for controlling a data transfer between a processor and an input/output device including
    a stack which is addressable and which is disposed between the processor and the input/output device to permit data supplied from the processor and input/output device to be temporarily stored in the stack;
    a first register for storing an initial address and final address from the processor;
    a first up/down counter connected to the first register, said first register adapted to load said initial address and said final address in said first counter;
    a clock pulse generator for sequentially supplying first clock signals to said first up/down counter, whereby said first up/down counter begins a count-up or count-down operation in response to a count-up or count-down control signal applied from the processor and, during the count-up or count-down operation, delivers an output signal for each sequential first clock signal for designating an address of the stack; and
    a first address decoder connected to the first counter for decoding each output signal of the first counter and designating the corresponding address at the stack;

the improvement providing bidirectional transfer of information through the stack comprising;
a second register for storing an initial address and final address from the input/output device;
a second up/down counter connected to the second register, said second register adapted to load said initial address and final address from the input/output device in said second counter, said clock pulse generator sequentially applying second clock signals to said second up/down counter, whereby said second up/down counter begins a count-up or count-down operation in response to a count-up or count-down control signal applied from the input/output device and, during the count-up or count-down operation, delivers an output signal for each sequential second clock signal for designating an address of the stack; and
a second address decoder connected to the second counter for decoding each output signal of the second counter and designating the corresponding address at the stack.

2. In combination with a data transfer control system for controlling a data transfer between a first processor and a second processor including
a stack which is addressable and which is disposed between the first and second processors to permit data supplied from the first processor and second processor to be temporarily stored in the stack;
a first register for storing an initial address and final address from the first processor;
a first up/down counter connected to the first register, said final register adapted to load said initial address and said final address in said first counter;
a clock pulse generator for sequentially supplying first clock signals to said first up/down counter, whereby said first up/down counter begins a count-up or count-down operation in response to a count-up or count-down control signal applied from the first processor and, during the count-up or count-down operation, delivers an output signal for each sequential first clock signal for designating an address of the stack; and
a first address decoder connected to the first counter for decoding each output signal of the first counter and designating the corresponding address at the stack;
the improvement providing bidirectional transfer of information through the stack comprising;
a second register for storing an initial address and final address from the second processor;
a second up/down counter connected to the second register, said second register adapted to load the initial address and final address from the second processor in said counter, said clock pulse generator sequentially applying second clock signals to said second up/down counter, whereby said second up/down counter begins a count-up or count-down operation in response to a count-up or count-down control signal applied from the second processor and, during the count-up or count-down operation, delivers an output signal for each sequential second clock signal for designating an address of the stack; and
a second address decoder connected to the second counter for decoding each output signal of the second counter and designating the corresponding address at the stack.

3. In combination with a data transfer control system for controlling a data transfer between a processor and an input/output device including
a stack which is addressable and which is disposed between the processor and the input/output device to permit data supplied from the processor and input/output device to be temporarily stored in the stack;
a first register for storing an initial address and final address from the processor;
a first up/down counter connected to the first register, said first register adapted to load said initial address and final address in the first up/down counter;
a clock pulse generator for sequentially supplying first clock signals to said first up/down counter, whereby said first up/down counter is set to its count-up or count-down operation in response to a count-up or count-down control signal applied from the processor, and wherein said first counter, to which said initial and final addresses are loaded therein, is adapted to count first clock signals sequentially supplied from the clock pulse generator so that the contents of the first counter are changed from the contents corresponding to said initial address up to the contents corresponding to said final address, and wherein said first up/down counter delivers an output signal for each of the first clock signals for designating an address of the stack; and
a first address decoder connected to the first counter to decode each output signal of the first counter so as to designate the corresponding address at said stack;
the improvement providing bidirectional transfer of information through the stack comprising:
a second register for storing an initial address and final address from the input-output device;
a second up/down counter, connected to the second register, said second register adapted to load said initial address and final address from the input/output device in the second up/down counter, whereby said second up/down counter is set to its count-up or count-down operation in response to a count-up or count-down control signal applied from the input/output device, and wherein said second counter, after said initial and final addresses from the input/output device are loaded therein, is adapted to count second clock signals sequentially supplied from the clock pulse generator so that the contents of the second counter are changed from the contents corresponding to said initial address up to the contents corresponding to said final address, and wherein said second up/down counter delivers an output signal for each count of the second clock signal for designating an address of the stack; and
a second address decoder connected to the second counter to decode each output signal of the second counter so as to designate the corresponding address at said stack.

4. In combination with a data transfer control system for controlling a data transfer between a first processor and a second processor including
a stack which is addressable and which is disposed between the first and second processors to permit data supplied from the first and second processors to be temporarily stored in the stack;

a first register for storing an initial address and final address from the first processor;

a first up/down counter connected to the first register, said first register being adapted to load said initial address and final address in the first up/down counter;

a clock pulse generator for sequentially supplying first clock signals to said first up/down counter, whereby said first up/down counter is set to its count-up or count-down operation in response to a count-up or count-down control signal applied from the first processor, and wherein said first counter, after said initial and final addresses are loaded therein, is adapted to count first clock signals sequentially supplied from the clock pulse generator so that the contents of the first counter are changed from the contents corresponding to said initial address up to the contents corresponding to said final address, and wherein said first up/down counter delivers an output signal for each of the first clock signals for designating an address of the stack; and a first address decoder connected to the first counter to decode each output signal of the first counter so as to designate the corresponding address at said stack;

the improvement providing bidirectional transfer of information through the stack comprising:

a second register for storing an initial address and final address from the second processor;

a second up/down counter connected to the second register, said second register adapted to load said initial address and final address from the second processor in the second up/down counter, whereby said second up/down counter is set to its count-up or count-down operation in response to a count-up or count-down control signal applied from the second processor, and wherein said second counter, after said initial and final addresses from the second processor are loaded therein, is adapted to count second clock signals sequentially supplied from the clock pulse generator so that the contents of the second counter are changed from the contents corresponding to said initial address up to the contents corresponding to said final address, and wherein said second up/down counter delivers an output signal for each of the second clock signals for designating an address of the stack; and a second address decoder connected to the second counter to decode each output signal of the second counter so as to designate the corresponding address at said stack.

* * * * *